United States Patent Office 2,707,185
Patented Apr. 26, 1955

2,707,185

SCHIFF'S BASES OF 5-AMINOMETHYL PYRIMIDINES AND ISOMERS THEREOF

Hans Suter, Dorflingen, and Ernst Habicht, Schaffhausen, Switzerland, assignors to Cilag Limited, Schaffhausen, Switzerland, a Swiss company No Drawing. Application June 10, 1953,
Serial No. 360,807

Claims priority, application Switzerland June 27, 1952

6 Claims. (Cl. 260—256.4)

This invention relates to new Schiff's bases and their production.

The invention provides new chemical compounds, being Schiff's bases of the general formula

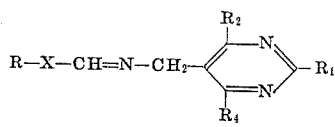

where $R_1$ represents a hydrogen atom, an alkyl or aralkyl radical, an amino, alkylamino, alkoxy or aralkoxy, a thiol, alkylthio or aralkylthio group, an acylthio or aroylthio group, $R_2$ represents a hydroxy or amino group, $R_4$ represents a hydrogen atom or an alkyl radical, X represents a straight- or branched-chain alkyl or alkenyl radical or a direct carbon linkage, and R represents an aromatic or saturated isocyclic or heterocyclic nucleus which may be substituted by hydroxy, alkoxy, alkyl, nitro, amino, acylamino, alkyl or dialkylamino, ureido or N'-alkyl-ureido groups; isomers of bases of the above general formula where $R_2$ represents the amino group, the said isomers having the general formula:

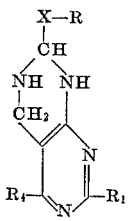

where R, $R_1$, $R_4$ and X have the meanings specified above; and salts of the said bases (including the said isomers) with non-toxic organic or inorganic acids.

The absorption spectrum obtained with those of the new bases in which $R_2$ is the amino group indicate a strong probability that these bases have the structure indicated by the second general formula above.

The new compounds of the above general formulae show valuable bacteriological properties. For example they retard the growth of Tbc germs and may therefore be used as remedies.

The new compounds are produced by methods known per se, for example by reacting an aminomethyl pyrimidine of the general formula

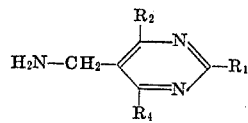

in which $R_1$, $R_2$ and $R_4$ have the above meaning, with a compound yielding the radical of the general formula $$R-X-CH< \qquad IV$$

in which R and X have the meaning given above.
Compounds which yield this radical IV include the corresponding aldehydes, their acetals and acyl derivatives and the corresponding dihalides.

The 5-aminomethyl pyrimidines of the Formula III may be used in their free form or as salts of an acid; in the latter case a quantity of alkali equivalent to the acid used to form the salt is added before, during or after the addition of the second reaction component.

If, for example, a benzal halide is used, it is preferable to work in the presence of a basic condensation agent, for example an alkali hydroxide, alkali oxide, alkali carbonate or alcoholate.

In general it is advisable to work in a solvent as, for example, in methanol, ethanol, acetone or dioxane.

Example 1

To a solution of 10.2 gms. of sodium in 500 ccs. of absolute methanol 50 gms. of 4-amino-2.6-dimethyl-5-aminomethylpyrimidine dihydrochloride are added, the whole is shortly heated up to boiling, cooled and a solution of 36 gms. of p-acetamino benzaldehyde in 500 ccs. of absolute methanol is added and for 15 minutes heated up to boiling. The methanol is distilled off in vacuo, the residue is treated with 800 ccs. of water and cooled to 0° C. with shaking. The precipitated product is separated by suctional filtration and recrystallised from water. In this way 51 gms., i. e. 77% of the theoretical quantity, of the p-acetamino benzal compound of 4-amino-2.6-dimethyl-5-aminomethylpyrimidine are obtained, melting at 174–177° C., which substance probably may be considered as to be 2.6-dimethyl-2'-p-acetyl-amino phenyl-1'-2'-3'.4'-tetrahydropyrimido-(5'.6':5.4)-pyrimidine.

The new compound is easily soluble in hot water and ethanol, in the remaining usual solvents it is hardly soluble. Its picrate melts at 209° C. with decomposition.

Example 2

50 gms. of 4-amino-2-methyl-5-aminomethyl pyrimidine dihydrochloride are converted with 11 gms. of sodium in 400 ccs. of absolute methanol in the usual way into the free base and reacted with 39 gms. of p-acetamino benzaldehyde in 300 ccs. of methanol.

46 gms. of the p-acetamino benzal compound, which melts at 232–233° C. with decomposition, are obtained which may be recrystallised from methanol. The 2-methyl-2'-p-acetamino phenyl-1'.2'.3'.4'-tetrahydropyrimido-(5'.6':5.4) pyrimidine forms a picrate which melts at 211–212° C. with decomposition.

Example 3

In an analogous manner to that described in the foregoing examples 2-amino-2'-p-acetamino phenyl-1'.2'.3'.4'-tetrahydropyrimido-(5'-6':5.4)-pyrimidine is obtained in the form of fine crystals, which melt at 196–197° C. with decomposition.

Melting point of picrate: 214–215° C. with decomposition.

Example 4

The 2.6-dimethyl-2'-p-dimethylamino phenyl-1'.2'.3'.4'-tetrahydropyrimido-(5'.6':5.4)-pyrimidine, which melts at 171–172° C., is obtained in analogous manner to the aforementioned compounds. Recrystallisable from acetic acid.

Example 5

2 - benzylmercapto - 2' - p-acetamino phenyl-1'.2'.3'.4'-tetrahydropyrimido-(5'.6':5.4)-pyrimidine is obtained in analogous manner and melts at 172–173° C. It is slightly soluble in water and the usual organic solvents other than acetic acid.

Example 6

2 - amino - 6 - methyl - 2' - p - acetamino phenyl-1'.2'.3'.4'-tetrahydropyrimido-(5'.6':5.4)-pyrimidine is obtained in analogous manner and melts at 220–221° C. with decomposition.

Example 7

2 - hydroxy - 2' - p - acetamino phenyl - 1'.2'.3'.4'-tetrahydropyrimido-(5'.6':5.4)-pyrimidine is obtained in analogous manner and melts at 245° C. with decomposition.

In an analogous manner the following 2.6-dimethyl-2'-substituted 1'. 2'. 3'. 4'-tetrahydropyrimido-(5'. 6'-5.4)-pyrimidines are obtained:

| Substituent in 2'-position | Melting point |
|---|---|
| p-Dimethylamino phenyl | 171–172° C. |
| p-N'-ethylureido phenyl | 168–169° C. | p-Hydroxyphenyl _____ 236–237° C./decomp.
o-Hydroxyphenyl _____ 205–206° C.
p-Hydroxy-m-methoxy phenyl_____ 201–203° C.
m.p-Dimethoxy phenyl_____ 95– 98° C.
o-Methoxy phenyl_____ 207–209° C.
p-Methoxy phenyl_____ 168–170° C.
3.4-methylene dihydroxy phenyl_____ 172–173° C.

What we claim is:
1. New chemical compounds selected from the group consisting of (a) Schiff's bases of the general formula

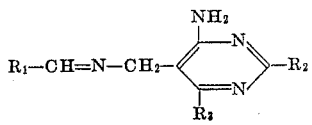

wherein $R_1$ is a substituent selected from the group consisting of a di-lower alkylamino phenyl radical, an acetamino phenyl radical, a lower alkoxy phenyl radical, a hydroxyphenyl radical, and an N'-lower alkyl ureido phenyl radical, $R_2$ is a substituent selected from the group consisting of a hydroxy group, an amino group, a lower alkyl group, and the benzyl mercapto group, $R_3$ is a substituent selected from the group consisting of a hydrogen atom and a lower alkyl radical, (b) isomers of said Schiff's bases, the isomers having the general formula

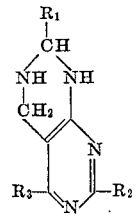

wherein $R_1$, $R_2$ and $R_3$ have the above specified meanings, and (c) salts of the said bases and isomers with nontoxic organic and inorganic acids.

2. The new chemical compound 2.6-dimethyl-2'-p-acetylamino phenyl-1'-2'-3'.4' - tetrahydropyrimido-(5'.6':5.4)-pyrimidine.

3. The new chemical compound 2-methyl-2'-p-acetamino phenyl-1'.2'.3'.4' - tetrahydropyrimido - (5'.6':5.4)-pyrimidine.

4. The new chemical compound 2-amino-2'-p-acetylamino phenyl - 1'.2'.3'.4'-tetrahydropyrimido-(5'.6':5.4)-pyrimidine.

5. The new chemical compound 2.6-dimethyl-2'-p-dimethylamino phenyl - 1'.2'.3'.4' - tetrahydropyrimido-(5'.6':5.4)-pyrimidine.

6. The new chemical compound 2-benzylmercapto-2'-p - acetamino phenyl - 1'.2'.3'.4' - tetrahydropyrimido-(5'.6':5.4)-pyrimidine.

No references cited.